S. S. EISENHART.
NUT LOCK.
APPLICATION FILED FEB. 18, 1920.
1,344,684.  Patented June 29, 1920.
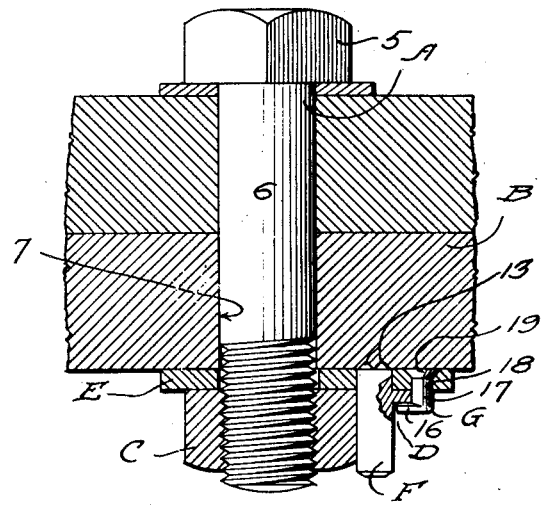
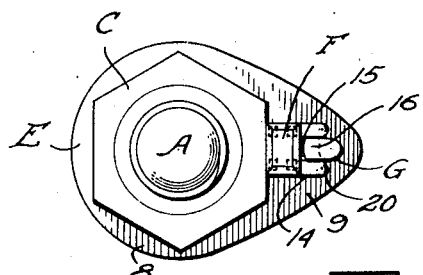
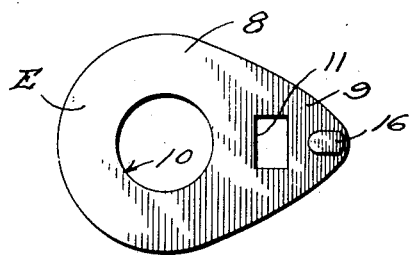  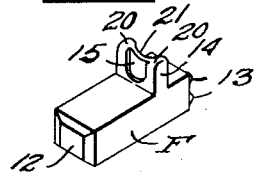
Inventor
Samuel S. Eisenhart,

UNITED STATES PATENT OFFICE.

SAMUEL S. EISENHART, OF AKRON, OHIO.

NUT-LOCK.

1,344,684. Specification of Letters Patent. Patented June 29, 1920.

Application filed February 18, 1920. Serial No. 359,622.

*To all whom it may concern:*

Be it known that I, SAMUEL S. EISENHART, a citizen of the United States, residing at Akron, in the county of Summit and State of Ohio, have invented certain new and useful Improvements in Nut-Locks, of which the following is a specification.

My present invention relates to nut locks.

The principal objects of the invention are to provide a nut lock which may be used in connection with standard bolts and nuts, without alteration or mutilation thereof; which may be disposed in operative relation to the nut so that it will effectively hold the same against rotation after the nut has been turned tight; and which is simple in construction and assemblage, and hence inexpensive to manufacture, and install.

Other objects and advantages of the invention will appear in the following detailed description, taken in connection with the accompanying drawing, forming a part of this specification, and in which drawing:

Figure 1 is a view partly in plan and partly in horizontal section showing a nut lock constructed according to my invention in use.

Fig. 2 is an end elevation of the same.

Fig. 3 is an elevation of a washer or plate, forming a part of the nut lock.

Fig. 4 is a perspective view of a key forming a part of the nut lock.

In the drawings, where similar characters refer to similar parts throughout the views, A designates a screw threaded element; B a body from which the screw threaded element A extends; C a nut on element A; and D a locking device constructed according to my invention and including a plate or washer E, a key F, for holding the washer against rotation with respect to body B, and nut C against rotation with respect to the washer, and a catch G for holding the key F in place.

In the example shown the nut lock is shown in operative relation to an ordinary bolt having a head 5 and shank 6 extending through the bore 7 in body B. The nut C is of ordinary hexagonal formation and is in screw threaded engagement with the shank 6. It is to be understood however that the nut lock may be used in connection with screw threaded elements other than bolts.

It is preferred to shape the plate or washer, oval in plan, that is, with a main portion 8 and an extension 9, the main portion provided with a bore 10 for the reception of the shank 6, a way 11 transversely through the plate or washer being provided adjacent the bore 10.

The key F may be rectangular in cross section under which conditions, the way 11 is also rectangular to accommodate the key. It is desirable to make the key F relatively longer than the combined thickness of the plate E and the nut C, as shown in Fig. 1 of the drawing so that the end 12 of the key may receive the blows of a hammer, or other tool, while the other end of the key is provided with teeth 13, which may be driven into the body B, as an example of one way in which to prevent movement of the washer E with respect to the body B.

As an example of means to prevent accidental displacement of the key, as might result from vibration, the key may be provided with a lateral projection 14 intermediate its ends, to rest against the plate or washer E when the teeth 13 have been driven into the body B. This projection 14 may be provided with a recess 15 at its exposed face to receive the bill 16 of the catch G. This catch may be pivotally carried by the plate or washer E, as by its stem 17 received in a bore 18 transversely of the plate, and having a counter sunk head 19, as clearly shown in Fig. 1 of the drawing. The bill 16 may be flexible, to a certain extent, and the outer edge of the projection 14 may be rounded as indicated at 20 to facilitate the swinging and guiding of the bill into the recess 15. The outer edge of this projection 14 may be concave as indicated at 21 to receive the stem or shank 17 of the catch, making the device compact in that the projecting portion 9 of the plate may not be needlessly long.

In assemblage, the plate or washer E is first disposed on the bolt or screw threaded element A, after which the nut C is turned tight. If, when so doing, one marginal face of the nut is not in proper relation to the key way 11 so that the key F may be brought into engagement with said face, the plate or washer E may be moved relative to the nut, as by tapping, with a hammer or other tool, on the projection 9. With one face of the nut C in proper relation to the key way, and with the catch bill 16 disposed as shown in Fig. 3 of the drawing, the key F may be placed to extend into the key way 11, with a portion of the key engaging the face of the nut. A hammer or other tool may then be used to drive the teeth 13 into the body B, after which the catch G may be swung into place as hereinbefore described.

It is to be observed that the key F prevents relative movement between the plate or washer E and the body B and also prevents relative movement of the nut C with respect to said plate or washer.

Changes in details may be made without departing from the spirit or scope of my invention; but,

I claim:

1. In combination with a screw threaded shank, a body from which the same extends, and a nut in screw threaded engagement with said shank, of a washer on said shank interposed between said nut and body, said washer having a transverse way, a key extending into said way of said washer and engaging said body to prevent movement of the washer with respect thereto and engaging said nut to prevent rotation of the same with respect to the washer, and a catch carried by said washer detachably holding said key in operative relation to said nut and body.

2. A nut lock comprising in combination, a plate provided with a transverse bore for the reception of a shank, and a transverse key way adjacent said bore, a key removably extending through said key way and provided with teeth at one end, and a catch carried by said plate adapted to hold said key in said relative position with respect to the plate.

3. A nut lock comprising in combination, a plate provided with a transverse bore for the reception of a shank, and a transverse key way adjacent said bore, a key removably extending through said key way and provided with teeth at one end, to project from one face of the plate, and a lateral projection at the other face thereof, and a catch carried by said plate adapted to move into engagement with said projection to hold said key in said relative position with respect to the plate.

4. A nut lock comprising in combination, a plate provided with a transverse bore for the reception of a shank, and a transverse way adjacent said bore, a key removably extending through said way and provided with teeth at one end, to extend beyond one face of the plate, and a lateral projection provided at the other face thereof, said projection provided with a recess, and a catch pivotally carried by said plate and adapted to be swung into the said recess of said projection to hold said key in the said relative position with respect to the plate.

SAMUEL S. EISENHART.